US 6,608,477 B2

(12) United States Patent
Sacks et al.

(10) Patent No.: US 6,608,477 B2
(45) Date of Patent: Aug. 19, 2003

(54) APPARATUS AND METHOD FOR ALTERING TRACK SCAN DATA BASED ON HEAD WIDTH RELATIVE TO DATA TRACK WIDTH AND DETERMINING THE POSITION ERROR SIGNAL FROM THE ALTERED TRACK SCAN DATA TO QUALIFY THE HEAD IN A DATA STORAGE DEVICE

(75) Inventors: Alexei Hiram Sacks, Edina, MN (US); Haoying Sun, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 89 days.

(21) Appl. No.: 09/825,069

(22) Filed: Apr. 2, 2001

(65) Prior Publication Data

US 2002/0080509 A1 Jun. 27, 2002

Related U.S. Application Data

(60) Provisional application No. 60/227,613, filed on Aug. 23, 2000.

(51) Int. Cl.[7] ............................................. G01R 33/12
(52) U.S. Cl. ..................... 324/210; 360/77.04; 324/212
(58) Field of Search ............................. 324/210, 211, 324/212, 262, 228, 758, 761, 202; 360/77.08, 77.02, 75, 77.04, 31; 369/53.25

(56) References Cited

U.S. PATENT DOCUMENTS

| 4,575,776 A | | 3/1986 | Stephens et al. |
|---|---|---|---|
| 4,802,033 A | | 1/1989 | Chi |
| 5,073,833 A | | 12/1991 | Best et al. |
| 5,115,360 A | | 5/1992 | Sidman |
| 5,436,773 A | * | 7/1995 | Hanson ........................ 360/66 |
| 5,500,776 A | | 3/1996 | Smith |
| 5,587,850 A | | 12/1996 | Ton-that |
| 5,751,512 A | | 5/1998 | Anderson |
| 5,760,990 A | | 6/1998 | Ukani et al. |
| 5,771,131 A | | 6/1998 | Pirzadeh |
| 5,825,579 A | | 10/1998 | Cheung et al. |
| 5,909,661 A | | 6/1999 | Abramovitch et al. |
| 5,914,830 A | | 6/1999 | Kadlec et al. |
| 5,926,338 A | | 7/1999 | Jeon et al. |
| 5,940,240 A | | 8/1999 | Kupferman |
| 6,091,564 A | | 7/2000 | Codilian et al. |
| 6,091,567 A | | 7/2000 | Cooper et al. |
| 6,151,196 A | | 11/2000 | Carlson et al. |
| 6,317,285 B1 | * | 11/2001 | Bi et al. ........................ 360/75 |
| 6,429,995 B1 | * | 8/2002 | Dobbek et al. ........... 360/77.08 |

FOREIGN PATENT DOCUMENTS

| EP | 0420693 A3 | 4/1994 |
|---|---|---|
| WO | WO 96/10821 | 4/1996 |

OTHER PUBLICATIONS

Priyadarshee D. Mathur, "Position Sensing and Control For Magnetic Disk Drives," Carnegie Mellon University (Pittsburgh, PA), (May 10, 1999).

* cited by examiner

*Primary Examiner*—Edward Lefkowitz
*Assistant Examiner*—Subhash Zaveri
(74) *Attorney, Agent, or Firm*—Mitchell K. McCarthy

(57) ABSTRACT

A method and apparatus to qualify heads to be used in disc drives. The method and apparatus collect a set of track scan data by moving the head across transitions in a track on a medium. The track scan data is changed based on a difference between a writer width of the head and a nominal track width to produce modified track scan data. Position error signal data is then determined from at least some of the data in the modified set of track scan data. The linearity of the position error signal data is used to qualify the head.

20 Claims, 7 Drawing Sheets

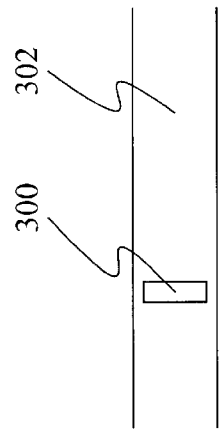
FIG. 3
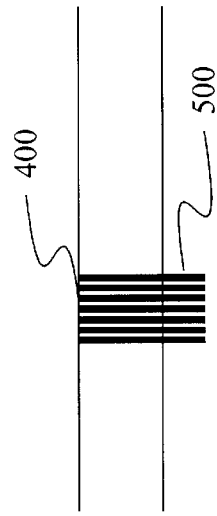
FIG. 5
FIG. 6
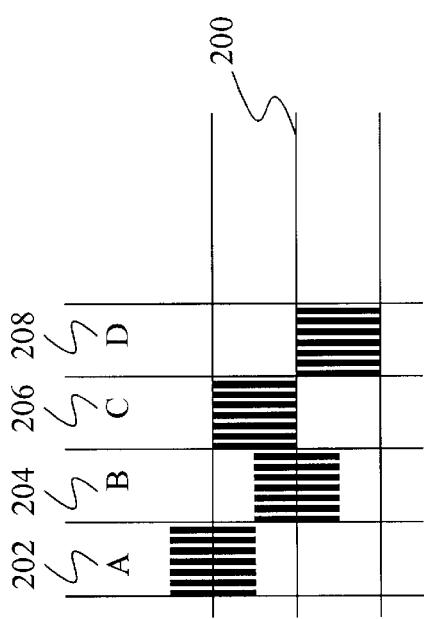
FIG. 2
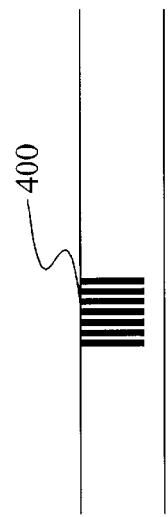
FIG. 4

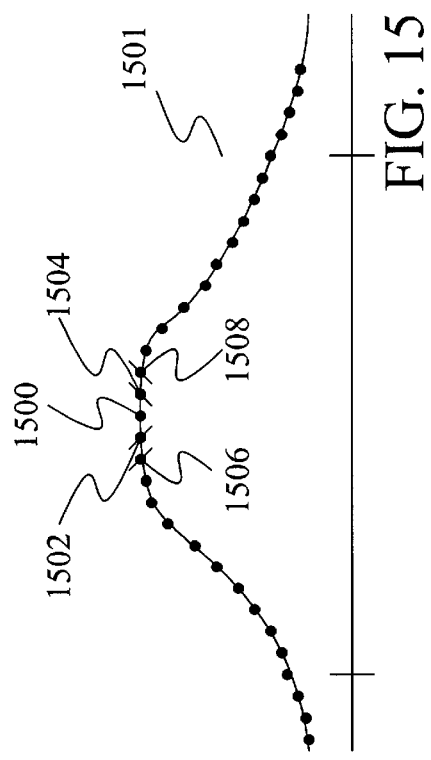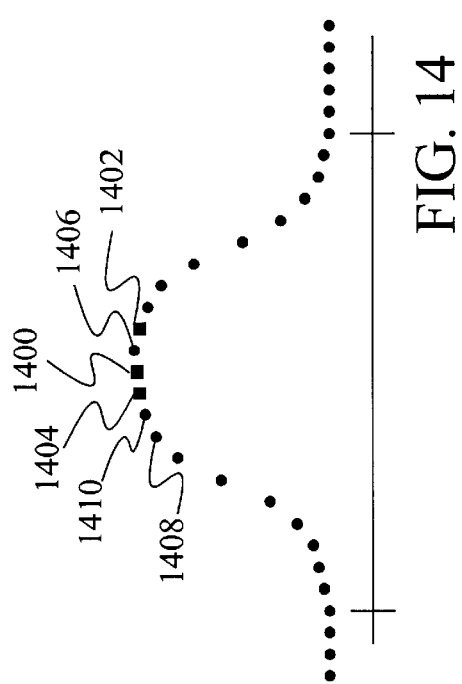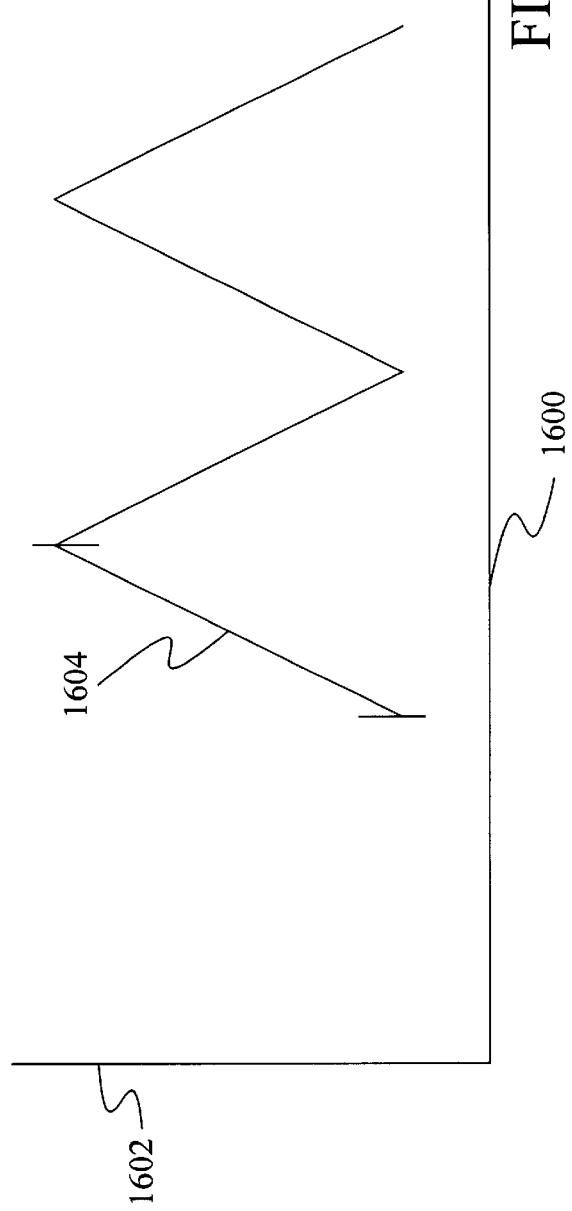

APPARATUS AND METHOD FOR ALTERING TRACK SCAN DATA BASED ON HEAD WIDTH RELATIVE TO DATA TRACK WIDTH AND DETERMINING THE POSITION ERROR SIGNAL FROM THE ALTERED TRACK SCAN DATA TO QUALIFY THE HEAD IN A DATA STORAGE DEVICE

CROSS-REFERENCE TO RELATED APPLICATION

The present application claims priority from a provisional application filed on Aug. 23, 2000, having Ser. No. 60/227,613 filed Aug. 28, 2000, and entitled "METHOD OF USING TRACK SCAN DATA TO ESTIMATE THE SERVO PES LINEARITY".

FIELD OF THE INVENTION

The present invention relates to qualifying heads for storage devices. In particular, the present invention relates to qualifying heads based on the PES linearity produced by the head.

BACKGROUND OF THE INVENTION

In mass storage devices with movable heads, the position of the head is determined based on a position error signal (PES), which is generated from one or more servo fields on the storage medium. Ideally, the PES is a linear function of head position. In actual drives, many factors can adversely affect the linearity of the PES.

One of the major causes of non-linearity in the PES is the performance of the head. In the past, the benchmark for determining whether a head would produce a linear PES has been the reader width of the head. In the past, if the reader width was below 45 percent of the nominal track width for the medium or some other minimum reader width specification, the head was assumed to provide a nonlinear PES and was rejected.

With every new generation of disc drives, the track width on the medium decreases. This reduction in track width can only be achieved with a similar reduction in the size of the head. However, as head sizes have decreased, the ability to manufacture the head within tolerances has been reduced. Because of this, when a batch of heads is produced, more of the heads fail the test for being less than 45 percent of the nominal track width. This has resulted in a reduced yield of heads, thereby increasing manufacturing costs.

One way to improve the yields is to change the tests for non-linearity from being based on the reader width to being based on the actual linearity produced by the head. One way to do this is to test the head over a servo field and to measure the linearity of the PES generated by the head.

To perform this test, the head would be placed on a spin-stand tester where it would write a servo field and then read from the servo field to generate the PES. This option is unattractive because spin-stands that are able to write servo fields are extremely expensive and difficult to implement.

In light of this, the art has suggested that the PES linearity could be modeled based on track scan data. Track scan data is determined in a spin-stand tester by writing a single track of data. The head is then moved across the data in a radial direction and the amplitude of the read signal is recorded at each of a set of positions across the track. This provides a read profile that can be used to simulate the read profile that would be read from servo bursts in the servo field. By combining these servo burst profiles together, a PES model can be generated.

For servo bursts that have a width that is less than the writer width of the head, accurate track scan data can be produced by writing the track and then trimming it to the width of the servo burst. Thus, in drives that use the common ratio of three servo burst widths to two nominal track widths, track scan data can be produced that allows for an accurate estimate of the PES that would be produced by the head.

However, this suggested technique has not been successful at accurately predicting the linearity of the PES generated by a head when the servo bursts have a width that matches the nominal track width. Because of this, it has not been widely adopted in the industry for drives that have such "one-to-one" ratios between the servo track widths and the data track widths.

SUMMARY OF THE INVENTION

A method and apparatus to qualify heads to be used in disc drives. The method and apparatus collect a set of track scan data by moving the head across transitions in a track on a medium. The track scan data is changed based on a difference between a writer width of the head and a nominal track width to produce modified track scan data. Position error signal data is then determined from at least some of the data in the modified set of track scan data. The linearity of the position error signal data is used to qualify the head.

Additional features and benefits will become apparent upon a review of the following figures and their accompanying detailed description.

BRIEF DESCRIPTION OF THE DRAWINGS

FIG. 2 is a depiction of a servo area.

FIG. 3 is a depiction of a head within a track on a medium.

FIGS. 4, 5, and 6 show the appearance of a servo burst during the various stages of construction of a servo burst.

FIG. 14 shows the track scan data of FIG. 11 expanded with additional track scan points.

FIG. 15 shows the track scan data of FIG. 13 with the removal of track scan points.

FIG. 16 shows a PES signal generated through the embodiments of the present invention.

DETAILED DESCRIPTION OF ILLUSTRATIVE EMBODIMENTS

Figure 1:
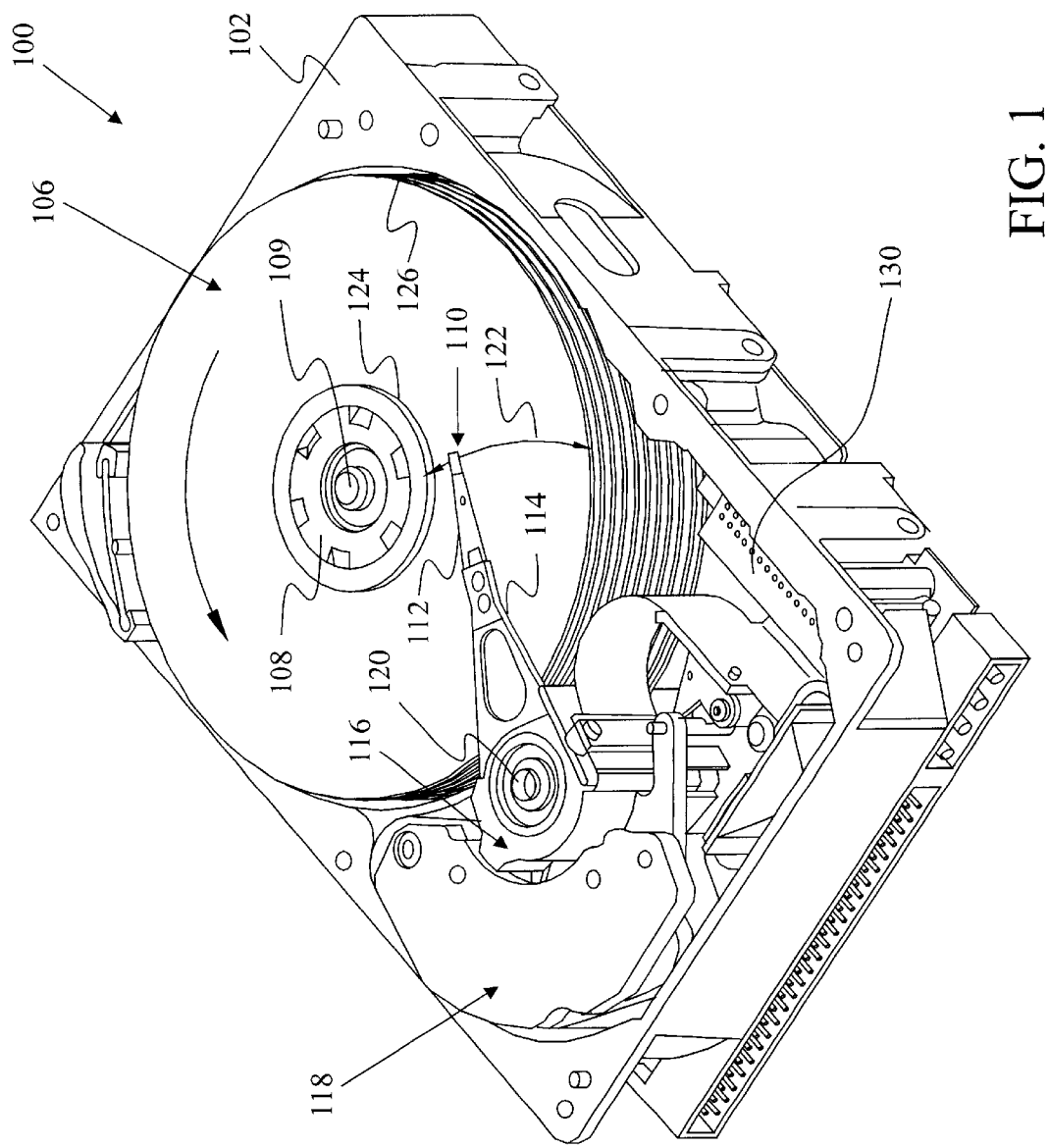
FIG. 1 is a plan view of a disc drive storage device in which heads qualified through embodiments of the present invention are implemented.

FIG. 1 is a perspective view of a disc drive 100 in which the present invention is useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Each head in the disc drive has a physical reader width, a physical writer width, an electrical reader width, and an electrical writer width. The physical widths are the widths of the reader structure and writer structure in the head. The electrical reader width is the span on the medium over which the head senses transitions. The electrical writer width is the width of the transitions written to the medium by the head. In the discussion below, references to the reader width and the writer width are to be understood as references to the electrical reader width and the electrical writer width.

The heads in the disc drive of FIG. 1 are positioned based on servo fields stored on one or more of the discs in the disc pack. The servo fields can include null-type servo fields or split-burst amplitude servo fields. An example of a split-burst amplitude servo field is show in FIG. 2.

The split-burst amplitude field consists of four servo bursts areas 202 (A), 204 (B), 206 (C) and 208 (D). Each burst contains a series of magnetic transitions that are one track wide. In FIG. 2, the ratio of servo burst width to nominal track width is one-to-one such that the edges of the A and B bursts are aligned along the track centers while the edges of the C and D burst are aligned along the track edges. For example, the edges of the C and D transitions are aligned along track edge 200 in FIG. 2.

Although each burst consists of transitions that are a full track wide, the read/write head is typically constructed to have a nominal writer width that is only 85 percent of the nominal track width. This is shown in FIG. 3 where the writer width of head 300 is shown to be smaller than the nominal width of track 302. Because the writer width is less than the nominal width of the track, the transitions for each servo burst must be written in stages. These stages are shown in FIGS. 4, 5, and 6.

In FIG. 4, the head forms a series of transitions 400 that constitute a part of a full burst, in this case a C burst. The head is then radially shifted to form a second set of transitions 500 that constitute a second part of the burst. This second set of transitions is aligned with the first set of transitions 400 to form a total set of transitions that extends over a track width. Next, the head is passed over the portion of the transitions that extends beyond the nominal track width to erase that portion, leaving a burst of transitions 600, as shown in FIG. 6, that is exactly one track wide.

Thus, as shown in FIGS. 3–6, even though the writer width is less than the nominal track width, each servo burst has a width that is equal to the nominal track width.

Because of the need to align the transitions when writing the servo bursts, the equipment needed to generate a servo area on a medium outside of a disc drive is expensive. Because of this, the art does not use actual servo fields when determining whether a particular head will generate a linear PES. Instead, the art estimates the linearity based on some other attribute of the head.

The present invention provides an improved means for determining whether a head will generate a linear PES signal. This improved technique is shown in the flow diagram of FIG. 7, which is described below with reference to the block diagram of FIG. 8.

Figure 7:
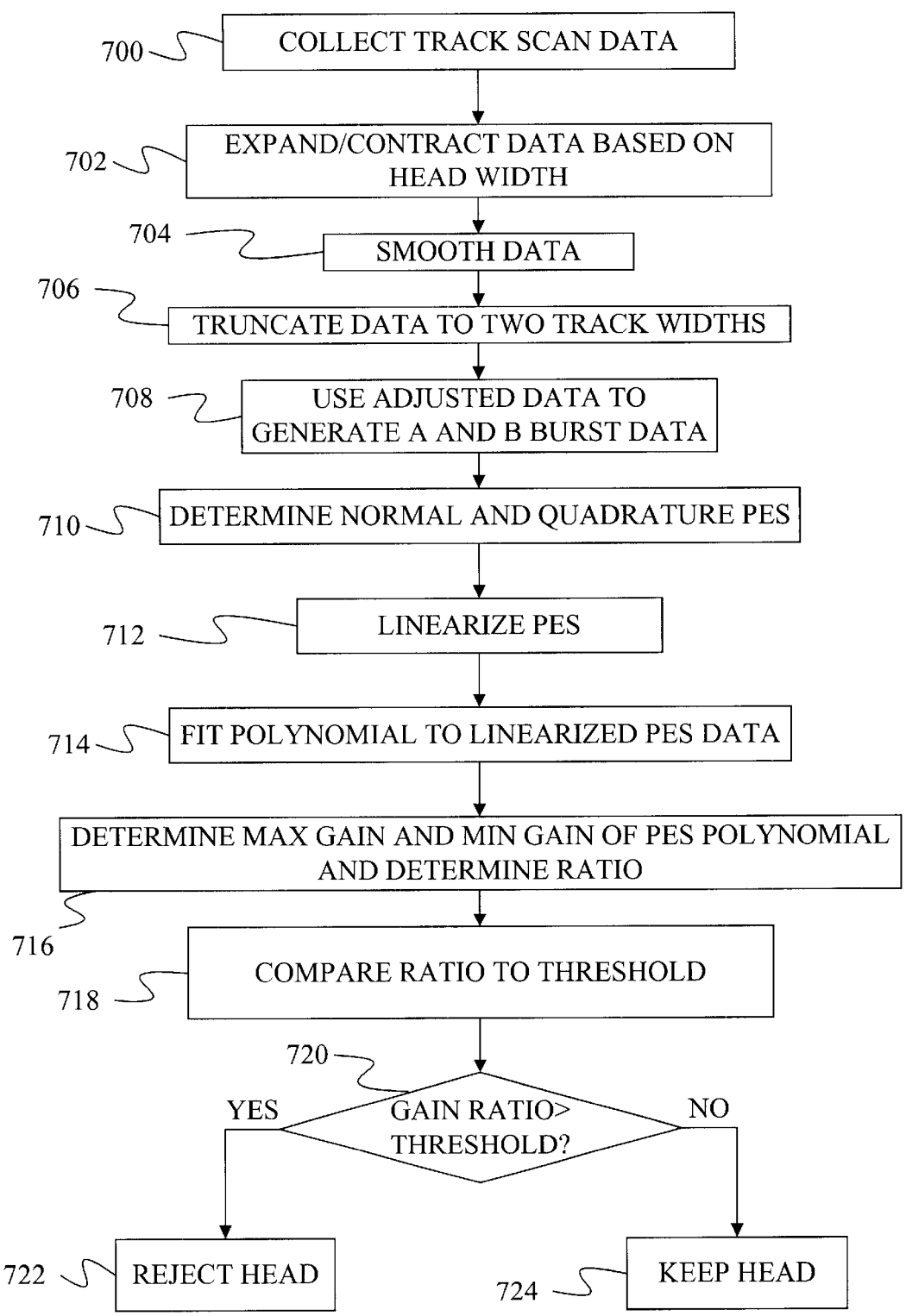
FIG. 7 is a flow diagram under a method of the present invention for qualifying a head.
Figure 8:
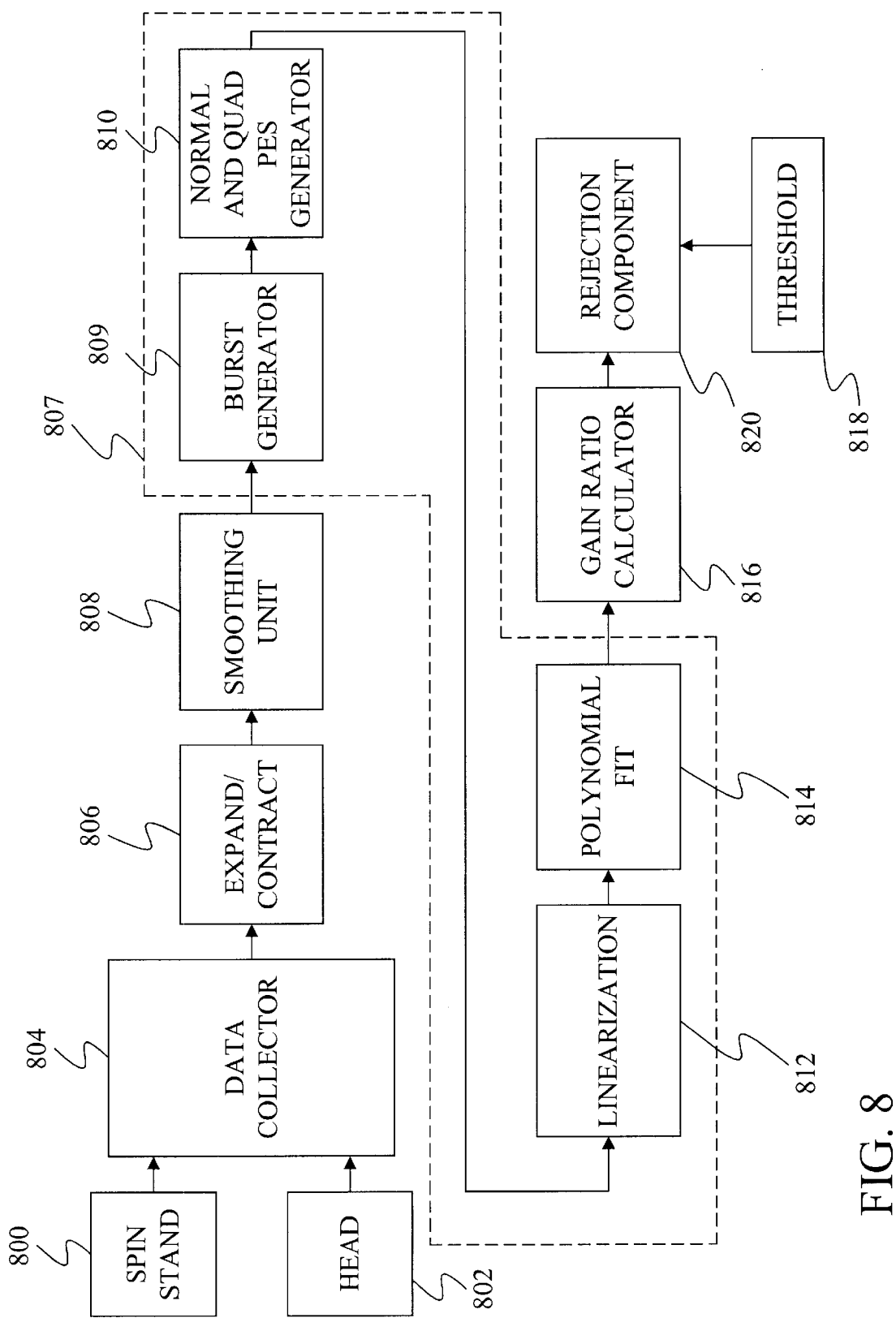
FIG. 8 is a block diagram of elements used in the method of FIG. 7.
Figure 9:
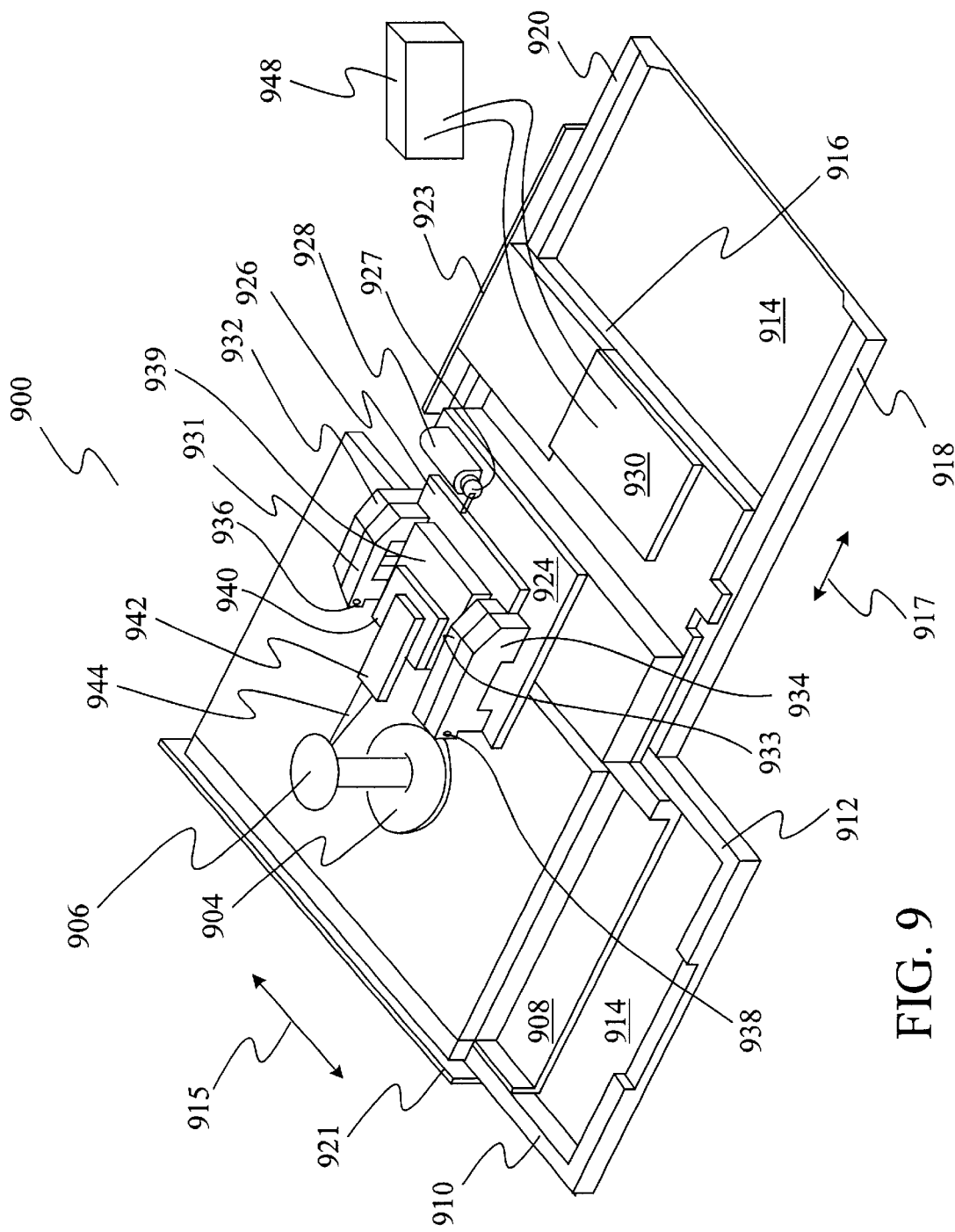
FIG. 9 is a block diagram of a spin-stand tester.

In step 700 of FIG. 7, track scan data is collected by a data collector 804 using a spin-stand 800 and a head 802 of FIG. 8. An example of a spin-stand 900 is shown in FIG. 9.

Spin-stand 900 includes a disc 906 mounted on a spindle 902, which is rotated by spindle motor 904. Spindle motor 904 rests on a platform 908 that moves between two guide rails 910 and 912. In one embodiment, platform 908 is supported by a cushion of air during movement and is stabilized in a particular position by the application of a vacuum between platform 908 and a granite face 914 directly below platform 908. For purposes of reference, movement of platform 908 along guides 910 and 912 is considered to be in the "X" direction as shown by arrows 915. A position encoder 921 is located along guide 910 to provide an indication of the position of platform 908.

Spin-stand 900 also includes a carriage 916 that moves between rails 918 and 920 in the "Y" direction shown by arrows 917. Like platform 908, carriage 916 is supported by a cushion of air during movement and is locked into position by applying a vacuum between carriage 916 and granite base 914. A position encoder 923 is located along guide 920 to provide an indication of the position of platform 916.

In one embodiment, carriage 916 and platform 908 both move using electromotive motors mounted between one of the guide rails and the respective platform or carriage. Other types of motors, such as a stepper motor for example, may be used in place of the electromotive motors.

Carriage 916 supports a printed circuit board 930 and a support platform 924. Support platform 924 includes a pair of support brackets 932, 934 that are connected by respective pivot pins 936 and 938 to a pair of support brackets 931, 933 on a pivoting platform 926. Through support brackets 931, 932, 933, and 934, support platform 924 supports pivoting platform 926 so that it may pivot about pivot pins 936 and 938. Support platform 924 also supports a pivot motor 928, which has an eccentric cam 929 that is in contact with pivoting platform 926.

Pivoting platform 926 supports a mounting platform 939 that provides a base for a piezo platform 940. Piezo platform 940 is connected to a suspension chuck 942 that holds a disc drive suspension 944 as shown in more detail below. Piezo platform 940 is connected to suspension chuck 942 through piezo elements that are able to move suspension chuck 942 in the "X" direction as shown by arrows 915. The piezo elements of piezo platform 940 are able to move suspension chuck 942 by distances of less than 10 nanometers in response to electrical signals received from a control circuit.

During head loading operations, pivot motor 928 rotates eccentric cam 929 causing the back end of pivoting platform 926 to rotate upward about pivot pins 938 and 936. Suspension chuck 942, which carries suspension 944, is then placed on piezo platform 940 and spindle motor 904 is activated so that disc 906 rotates at a desired speed. With the suspension loaded, carriage 916 is moved forward so that a head at the end of suspension 944 moves under disc 906. Support platform 908 is also moved so that the head is positioned at a desired radius along disc 906. When the head nears the desired disc location, motor 928 rotates eccentric cam 929 back so that pivoting platform 926 returns to its level position and the head is brought into proximity with disc 906. The head on suspension 944 then flies over the surface of disc 906.

The head on suspension 944 is connected by electrical leads to printed circuit 930, which has further connections to a test box 948. Test box 948 controls the types of tests performed on the head. In particular, test box 948 designates the location for the test track, the data to be written to the disc, and the position of the read head within the written track during read back of the test data. Using the piezo elements of piezo platform 940, the read head can be moved to a number of different locations within a track during read back, so that the profile of the read head can be determined.

Figure 10:
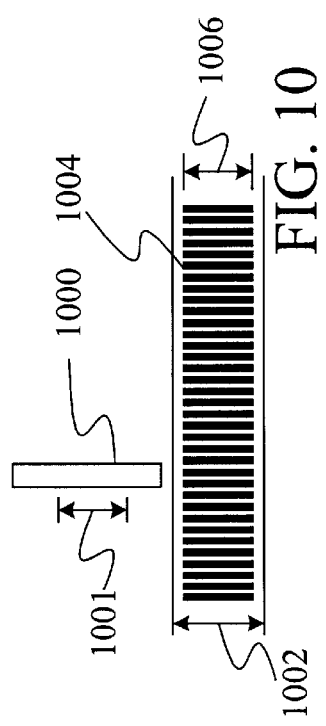
FIG. 10 shows the layout of a track used in track scan testing with a head that has a writer width that is smaller than the nominal width of the track.
Figure 12:
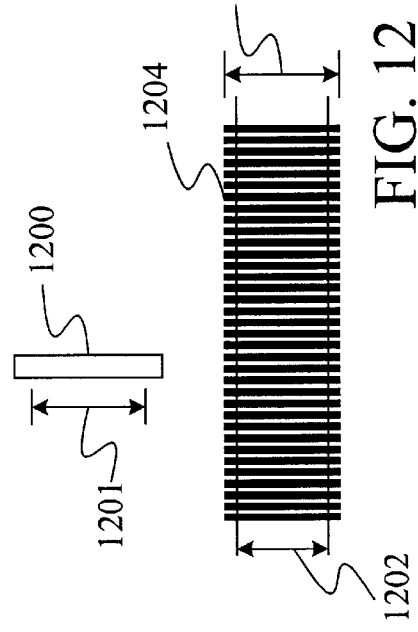
FIG. 12 shows the layout of a track with a head that has a writer width that is larger than the nominal width of the track.

The track scan data collected in step 700 of FIG. 7 is produced by first writing a single track on the spin-stand while maintaining the head in a single radial position. Examples of the resulting tracks are shown in FIGS. 10 and 12. In FIG. 10, head 1000 has a writer width 1001 is narrower than the nominal track width 1002 resulting in transitions 1004 that have a width 1006 that is narrower than nominal track width 1002. In FIG. 12, the writer width 1201 of head 1200 is larger than the nominal track width 1202. This produces written transitions 1204 that have a width 1206 that is greater than the nominal track width 1202.

After the tracks have been written, the head is placed on one side of the nominal track so that the head does not overlap the transitions in the track. The head is then moved radially in steps across the track while the amplitude of the resulting read signal is recorded. As the head enters the transitions written for the track, the amplitude increases until the head is centered within the track. As the head moves past track center, the amplitude of the read signal decreases until it reaches 0 when the head moves outside of the written transitions.

Figure 11:
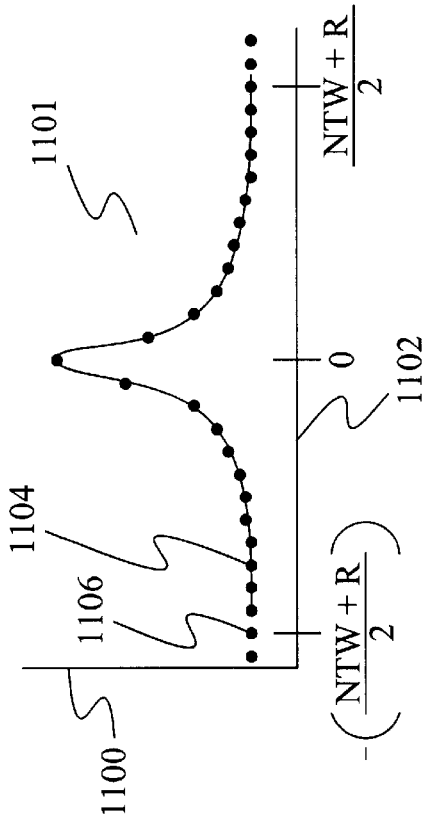
FIG. 11 shows the track scan data for the head and track of FIG. 10.
Figure 13:
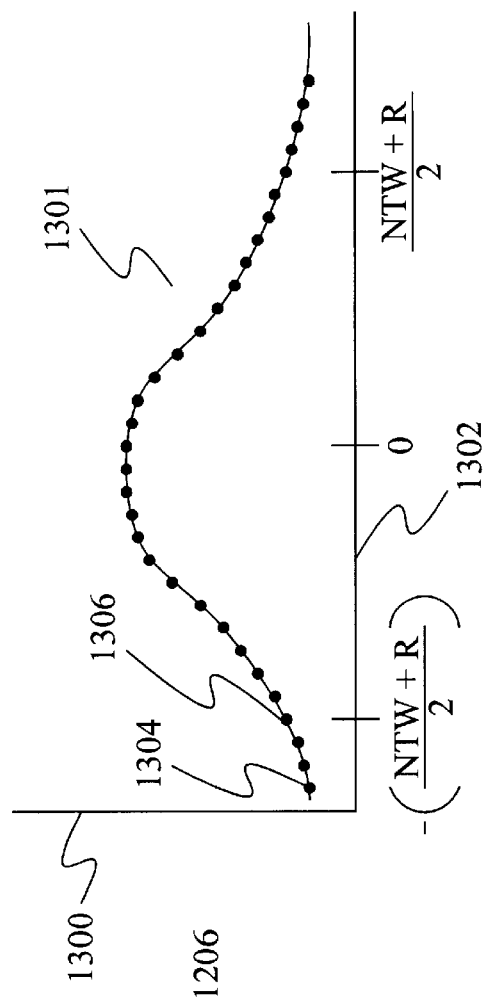
FIG. 13 shows the track scan data for the head and track of FIG. 12.

Examples of the track scan data 1101 and 1301 are shown in FIGS. 11 and 13, respectively, for the heads and tracks shown in FIGS. 10 and 12, respectively. In FIGS. 11 and 13, the amplitude of the read signal is shown along vertical axes 1100 and 1300, respectively, and radial distance is shown along horizontal axes 1102 and 1302, respectively.

If the writer width matches the nominal track width, the track scan data will reach its minimum when the center of the head has moved away from track center by a distance:

$$\min\_dist = \frac{NTW + R}{2} \qquad \text{EQ. 1}$$

where min_dist. is the point at which the data reaches its minimum, NTW is the nominal track width, and R is the reader width. However, when the writer width does not match the nominal track width, this is not true. For example, when the writer width is smaller than the track width, the track scan data reaches its minimum when the head is less than this distance from track center. When the writer width is larger than the track width, the track scan data reaches its minimum when the head is more than this distance from track center.

These two situations are shown in FIGS. 11 and 13. In FIG. 11, the narrower head produces track scan data that reaches its minimum at a point 1104 well before point 1106, which is at the distance indicated by equation 1 above. In FIG. 13, the wider head produces track scan data that reaches its minimum at point 1304 after point 1306, which is at the distance indicated by equation 1.

The present inventors have discovered that the point at which the track scan data reaches its minimum affects the ability to model the PES from such track scan data. Under prior art techniques that attempted to use track scan data to model PES, it was assumed that the track scan data could be used directly to model the behavior of the head over the PES fields. However, as shown above, for systems with one-to-one ratios between the servo track widths and the data track widths the PES fields are written to ensure that they have transitions that cover a full track width, even if the writer width is less than or more than a track width. Thus, under the prior art, track scan data which was collected for a track that was either smaller than a track width or larger than a track width was being applied to model a read signal that would be generated from transitions that were exactly one track width. This mismatch between the transitions that were measured for the collected data and the transitions that were to be modeled, created inaccuracies in the PES linearity. As a result, the prior art could not generate a PES model that provided strong correlation between the model and the actual linearity produced by the heads when they were placed in a drive.

The present inventors have identified a method for adjusting the track scan data so that it can be used to accurately model the PES linearity. This process begins at step 702 where an expand and contract unit 806 modifies the track scan data accumulated by data collector 804. In particular, expand and contract unit 806 either adds additional data points or removes data points from the track scan data so that the track scan data reaches its minimum at the point indicated by equation 1 above. This distance corresponds to the point at which the data would reach its minimum if the writer width matched the nominal track width.

Under one embodiment, expand and contract unit 806 determines how many points must be added or deleted by using the following equation:

$$D = \left[ \frac{WR\_WDT - NTW}{d} \right] \qquad \text{EQ. 2}$$

Where d is the step size used when moving the head across the track to collect the track scan data, WR_WDT is the writer width, NTW is the nominal track width, and D is an integer indicating the number of data points that needed to be added to or deleted from the track scan data. If D is positive, data points need to be deleted. If D is negative, data points need to be inserted.

The writer width is determined from the track scan data using any of several well-known techniques. These techniques are not repeated here for simplicity.

When deleting data points from the track scan data, the present invention alternately removes data points from the left of and to the right of a point "P" that is at the center of the data scan curve. Removal of such points is shown in FIG. 15 where four points have been deleted from a set of track scan data 1501 around a center point 1500. In FIG. 15, point 1502 is the first point to be deleted followed by point 1504. Point 1506 is then deleted followed by point 1508. Note that an equal number of points do not have to be deleted from each side of center point 1500. Instead, points are removed from the left and then the right until the number of points deleted equals D from equation 1.

Note that deleting points involves removing collected data from a memory containing the track scan data. When a data point is removed, the other data points in the memory are shifted so that the remaining data points appear consecutive. Thus, looking at the data after the data points have been removed, each of the remaining data points appear to have been collected from points on the medium that are separated by the step size d.

When inserting data points into the track scan data, the data points are similarly inserted alternatively to the left of and to the right of a center point of the track scan data. This is shown in FIG. 14, where points 1400, 1402, and 1404 had been inserted into a set of track scan data 1401 around center point 1406. The values of the data points that are inserted are determined from an average of other data points. In particular, the data points inserted to the left of the center point P are calculated as:

$$S_{left,m} = \frac{\sum_{j=p-m}^{p} S_j}{m+1}, m = 1, 2, \ldots \quad \text{EQ. 3}$$

where $S_{left,m}$ is the value of the mth data point inserted to the left of point p, $S_j$ is the value of the jth data point, and p is the center point. Thus, data point 1404 would be calculated as:

$$S_{left,2} = \frac{S_{p-2} + S_{p-1} + S_p}{3} \quad \text{EQ. 4}$$

where $S_{p-2}$ is the value of data point 1408 of FIG. 14, $S_{p-1}$ is the value of data point 1410, and $S_p$ is the value of data point 1400.

Similarly, data points inserted to the right of point p are calculated as:

$$S_{right,m} = \frac{\sum_{j=p}^{p+m} S_j}{m+1}, m = 1, 2, \ldots \quad \text{EQ. 5}$$

Note that the inserted data points are simply inserted into a memory. As such, they are considered as having been read from the medium at a radial position that is separated by the step size d from the two closest data points in the memory. Thus, inserted point 1400 is considered to have been generated at a radial point that is a distance d from the point where data point 1406 was read and a point that is a distance d from the point at which data point 1404 was read.

Once the track scan data has been expanded or contracted in step 702, the process of FIG. 7 continues at step 704 where the expanded or contracted data is smoothed by a smoothing unit 808 using a filtering equation:

$$S(r) = \frac{S(r-2) + 2S(r-1) + 4S(r) + 2S(r+1) + S(r+2)}{10} \quad \text{EQ. 6}$$

where S(x) is the value of a data point in the track scan data indexed by a value "x", and r is the index of a current data point being filtered. This filtering operation is performed for each data point in the expanded and/or contracted track scan data.

After the data has been smoothed in step 704, it is truncated so that the data only includes enough points to cover two track widths. The number of data points needed can be calculated as:

$$\frac{2 \cdot NTW}{d} \quad \text{EQ. 7}$$

Preferably, the truncated data is taken from both the left and the right of the track scan data in equal amounts.

In step 708, the adjusted track scan data is used to generate A and B burst data using a burst generator 809, which forms part of a PES generator 807. Since bursts A and B are written at half track offsets relative to track center, the burst data can be calculated using the following equations:

$$A(r) = SAE\left(r + \frac{NTW}{2}\right) - SAE_e \quad \text{EQ. 8}$$

$$B(r) = SAE\left(r - \frac{NTW}{2}\right) - SAE_e \quad \text{EQ. 9}$$

where r is the cross track location, $SAE_e$ is a DC noise value that is equal to the track value of the adjusted track scan data at a point that is one track width away from track center, NTW is the nominal track width and SAE(x) is the value of the track scan data for the location on the medium identified by "x".

Once the A and B burst data has been generated, it can be used to generate normal and quadrate PES data at step 710 using a normal and quadrature PES generator 810. The normal PES data is formed using the general equation for normal PES which is:

$$PS1(r) = B(r) - A(r) \quad \text{EQ. 10}$$

where PS1(r) is the normal PES. Since the quadrate PES is the normal PES shifted by half a track width, the quadrate PES can be calculated from the normal PES as:

$$PS2(r) = PS1\left(r - \frac{NTW}{2}\right) \quad \text{EQ. 11}$$

where PS2(r) is the quadrate PES.

After the normal and quadrate PES have been generated, the PES is linearized at step 712 using a linearization unit 812. There are many known techniques for linearizing the PES signal including such techniques as NPQ, seamless, NPQ+seamless, and simplified NPQ+seamless. For example, the equation for determining the seamless linearized PES is:

$$PES = \frac{PS1}{|PS1| + |PS2|} \quad \text{EQ. 12}$$

where PES is the linearized PES data, PS1 is the normal PES and PS2 is the quadrature PES. The equation for NPQ+seamless is:

$$PES = \frac{PS1 + PS2}{|PS1 + PS2| + |PS1 - PS2|} \quad \text{EQ. 13}$$

and the equation for simplified NPQ+seamless is:

$$PES_{Simplified\ NQS} = kPES_{NPQS} + (1-2k)PES_{NPQS}^2 \quad \text{EQ. 14}$$

where k is a calibration factor calculated adaptively by making the average gains at one quarter track and track center equal, and $PES_{NPQS}$ is the result of commutation between NPQS_n and NPQS_q which are:

$$\text{NPQS\_n} = \frac{PS1}{2|PS2|} \qquad \text{EQ. 15}$$

$$\text{NPQS\_q} = \frac{PS2}{2|PS1|} \qquad \text{EQ. 16}$$

Once the PES data has been linearized, the PES data has a form as shown in FIG. 16 where radial position is shown along horizontal axis 1600 and the amplitude of the PES value is shown along vertical axis 1602.

At step 714, the linearized PES data is fit to a polynomial by a polynomial fit unit 814. In particular, peak-to-peak sections of the PES data, such as section 1604 of FIG. 16, which represent movement across an entire track, are fit to a polynomial. Under one embodiment, a section is fit to a seventh order polynomial. Under most embodiments, the data is fit to the polynomial using a least square means technique that is well known in the art. The resulting output polynomial is the output of PES generator 807.

To determine how linear the PES data is, the derivative of the polynomial is determined at various points along the track width. These derivatives are compared to each other to identify a maximum derivative and a minimum derivative at step 716 by a gain ratio calculator 816. Gain ratio calculator 816 also takes the ratio of the maximum derivative and the minimum derivative to generate a gain ratio.

This gain ratio is provided to a rejection component 820, which compares the gain ratio to a threshold 818 in step 718. In many embodiments, the threshold 818 is equal to 2. If the gain ratio is greater than the threshold at step 720, the PES data is considered to be non-linear and the head is rejected at step 722. If the gain ratio is less than or equal to the threshold, the head is kept at step 724.

In tests performed by the present inventors, the correlation between the linearity of the modeled PES data and the actual PES data generated by the head when its placed in a disc drive is much better than the correlation between the model PES and the actual PES for prior art systems that used the track scan data directly without expanding or contracting the data. As such, by expanding or contracting the track scan data, the present invention greatly improves the ability to predict the linearity of the PES that any particular head will produce.

In summary, the present invention provides a method of qualifying a head 110 to be used in a disc drive 100. The method includes collecting a set of track scan data 1101, 1301 by moving the head across transitions 1004, 1204 in a track on a medium. The track scan data is changed based on a difference between a writer width of the head 1001, 1201 and a nominal track width 1002, 1202 to produce modified track scan data 1401, 1501. Position error signal data 1604 is then determined from at least some of the data in the modified set of track scan data 1401, 1501. The linearity of the position error signal data 1604 is used to qualify the head 110.

In other embodiments of the present invention, an apparatus is provided for qualifying heads 110 for a disc drive 100. The apparatus includes a data collector 804 that collects track scan data. An expander/contractor 806 changes the track scan data based on the difference between a head's writer width 1001, 1201 and a nominal track width 1002, 1202 to produce modified track scan data 1401, 1501. A position error signal generator 807 generates a description of a position error signal 1604 based on the modified track scan data 1401, 1501. This description is used by a gain ratio calculator 816 to calculate a gain ratio of the position error signal. Based on this gain ratio, a rejection component 820 determines whether to reject the head.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the head qualifying system while maintaining substantially the same functionality without departing from the scope and spirit of the present invention. In addition, although the preferred embodiment described herein is directed to a head qualifying system for a magnetic disc drive system, it will be appreciated by those skilled in the art that the teachings of the present invention can be applied to other systems, like tape drives or optical systems, without departing from the scope and spirit of the present invention.

What is claimed is:

1. A method of qualifying a head to be used in a disc drive, the method comprising steps of:
    (a) collecting a set of track scan data by moving the head across transitions in a track on a medium;
    (b) altering the number of data points used from the set of track scan data based on a difference between a writer width of the head and a nominal track width to produce a modified set of track scan data;
    (c) determining a position error signal data from at least some of the data in the modified set of track scan data; and
    (d) qualifying the head based on the linearity of the position error signal data.

2. The method of claim 1 wherein changing step (b) comprises removing track scan data from the set of track scan data.

3. The method of claim 2 wherein removing track scan data comprises:
    identifying a track scan data point associated with the head being positioned closer to the center of a track than to the edge of the track; and
    removing the identified track scan data point.

4. The method of claim 3 wherein removing track scan data further comprises:
    removing a track scan data point associated with the head being to a first side of the center of the track; and
    removing a track scan data point associated with the head being to a second side of the center of the track.

5. The method of claim 2 wherein changing step (b) further comprises smoothing the remaining track scan data in the set after removing track scan data.

6. The method of claim 1 wherein changing step (b) comprises adding track scan data to the set of track scan data.

7. The method of claim 6 wherein adding track scan data to the set of track scan data comprises adding a track scan data point that is associated with the head being positioned closer to the center of a track than to the edge of the track.

8. The method of claim 7 wherein adding track scan data further comprises determining the value of the track scan data point to be added by averaging the value of at least two track scan data points in the set of track scan data points.

9. The method of claim 6 wherein changing step (b) further comprises smoothing the set of track scan data after the track scan data points have been added.

10. The method of claim 1 wherein determining step (c) comprises:

determining non-linearized position error signal data from the modified set of track scan data; and linearizing the non-linearized position error signal data to form the position error signal data.

11. An apparatus for qualifying heads for a disc drive, the apparatus comprising:

a data collector for collecting track scan data;

an expander/contractor for altering the number of data points used from the track scan data based on the difference between a head's writer width and a nominal track width to produce modified track scan data;

a position error signal generator for generating a description of a position error signal based on the modified track scan data;

a gain ratio calculator for calculating a gain ratio based on the description of the position error signal; and a rejection component that determines whether to reject the head based on the gain ratio.

12. The apparatus of claim 11 wherein the expander/contractor changes the track scan data by adding a data point to the track scan data.

13. The apparatus of claim 12 wherein the expander/contractor adds a data point to the track scan data by averaging the highest data point value with at least one other data point value to determine the value for the added data point.

14. The apparatus of claim 11 wherein the expander/contractor changes the track scan data by removing a data point from the track scan data.

15. The apparatus of claim 14 wherein the expander/contractor removes a data point by removing the data point that is closest in value to the highest data point value but is not the highest data point value.

16. The apparatus of claim 11 further comprising a smoothing component for smoothing the modified track scan data before it is used by the position error signal generator.

17. The apparatus of claim 11 wherein the position error signal generator comprises a non-linearized position error signal generator and a linearization component that linearizes the non-linearized position error signal.

18. An apparatus for qualifying heads for a disc drive, the apparatus comprising:

a data collector for collecting track scan data produced by a head;

rejection means for altering the number of data points from the track scan data based on the difference between a head's writer width and a nominal track width to produce modified track scan data and for rejecting a head based on the modified track scan data.

19. The apparatus of claim 18 wherein the rejection means changes the track scan data by adding a data point to the track scan data.

20. The apparatus of claim 18 wherein the rejection means changes the track scan data by removing a data point from the track scan data.

* * * * *